(12) United States Patent
Mortensen

(10) Patent No.: US 7,690,856 B2
(45) Date of Patent: Apr. 6, 2010

(54) CONNECTION DEVICE

(75) Inventor: Vidar Mortensen, Tromsø (NO)

(73) Assignee: Praktisk Teknologi AS, Alta (NO)

( * ) Notice: Subject to any disclaimer, the term of this patent is extended or adjusted under 35 U.S.C. 154(b) by 498 days.

(21) Appl. No.: 10/546,738

(22) PCT Filed: Feb. 27, 2004

(86) PCT No.: PCT/NO2004/000059

§ 371 (c)(1),
(2), (4) Date: Nov. 25, 2005

(87) PCT Pub. No.: WO2004/076303

PCT Pub. Date: Sep. 10, 2004

(65) Prior Publication Data

US 2006/0120797 A1    Jun. 8, 2006

(30) Foreign Application Priority Data

Feb. 28, 2003    (NO) .................................. 20030973

(51) Int. Cl.
*B25G 3/18*        (2006.01)
*F16B 21/00*       (2006.01)
*F16D 1/00*        (2006.01)

(52) U.S. Cl. ...................... 403/326; 403/327; 403/328; 206/509; 220/4.27

(58) Field of Classification Search ......... 403/326–328, 403/331, 333, 381; 206/509, 511; 220/4.27
See application file for complete search history.

(56) References Cited

U.S. PATENT DOCUMENTS 1,385,484 A * 7/1921 Case ........................ 220/4.27
2,888,970 A * 6/1959 Seaver ........................ 150/113
3,201,035 A * 8/1965 Martin et al. ............... 232/1 R
4,616,752 A * 10/1986 Ridgley ....................... 206/533
6,202,847 B1 * 3/2001 Hardy et al. ................ 206/509
6,648,390 B1 * 11/2003 Yang ........................... 294/161
6,874,634 B2 * 4/2005 Riley .......................... 206/439
7,137,522 B2 * 11/2006 Dubois .......................... 220/6

FOREIGN PATENT DOCUMENTS

| DE | 1947039 U | 9/1966 |
| DE | 3128122 | 2/1983 |
| DE | 3128122 A1 | 2/1983 |
| JP | 4721180 | 7/1972 |
| JP | 5232465 | 7/1977 |
| JP | 10316141 | 12/1998 |
| NO | 128862 | 1/1974 |
| SU | 435169 | 7/1974 |

OTHER PUBLICATIONS

Database WPI, Week 197518, Derwent Publications, XP002284285 & SU 435 169 A (Compr Refrig Equip), Nov. 20, 1974.
Fiskeriforskning Informerer No. Mar. 2002, 2 pages with English translation.

\* cited by examiner

*Primary Examiner*—Daniel P Stodola
*Assistant Examiner*—Nahid Amiri
(74) *Attorney, Agent, or Firm*—Jacobson Holman PLLC

(57) ABSTRACT

A connection device for connecting objects. The connection device includes a first elongated element with a first groove and a locking portion, a second elongated element with a second groove and a through hole, a spring member and a pin connected to the spring member, and an actuating member adapted for actuating the spring member and moving the pin.

6 Claims, 3 Drawing Sheets

CONNECTION DEVICE

This is a nationalization of PCT/N004/000059 filed Feb. 27, 2004 and published in English.

FIELD OF THE INVENTION

The invention regards a device for connecting together two or more objects.

BACKGROUND OF THE INVENTION

In many applications there is a need for connecting or coupling together objects, such as boxes, trays, cases, cages, containers or other objects.

One such application is tending and storing of benthonic organisms, such as sea urchins, abalones, sea cucumbers, scallop shells, oysters in aquatic environment.

Such a system is described in Norwegian Patent Application NO 20030973 which is hereby incorporated in this specification by reference.

Another application is cases or boxes for transporting and or storing items. In order to be able to stack the boxes efficiently and/or to move several boxes in one operation, it is preferable that they are safely and rigid connected to each other.

Also for construction elements there is a need for securely connecting the elements, such as provisional or permanent walls and floors, parquet floors, form elements etc.

NO 128862 shows an example on a prior art case for transporting fish which can be stacked. The case is made of plastic and has guiding grooves on the upper side and projections with trapezoidal shape in the base portion. The grooves and base projections are narrower in the middle than at the end portions, and this means that when the base projections are inserted sliding into the grooves, they will lock to each other by means of friction.

This connecting mechanism depends on the friction forces to keep the cases together. This will not be sufficient for many applications where it is important that the cases or other connected objects are securely connected even when influenced by external forces. It is for example very important that the tending/storing cases described in NO 20030973 are securely connected when immersed in the sea where they will be influenced by e.g. currents, tides, wind, etc. There is also no way to ensure that the cases are securely connected before transporting, handling or other use of the connected cases and there exists a risk that the cases will disconnect unexpectedly.

SUMMARY OF THE INVENTION

The object of the invention is to provide a device for coupling together/connecting objects, the device being rigid and secure even when exposed to strong external forces.

The device according to the invention comprises a first elongated element with a first groove and a locking portion, a second elongated element with a second groove and a through hole, a spring member and a pin connected to the spring member, and an actuating member adapted for actuating the spring member and moving the pin.

The first and second elements can be integrated parts of an object, or can be adapted for being connected to an object. The connection can be performed by means of screws, bolts, adhesive, or other suitable connection means. In one embodiment, the objects to be connected are made of a moulded material, in which case the elements and/or the spring member and pin can be formed during the moulding process. It is also a possibility that the spring member and the pin is manufactured and/or sold separately for later installation in the elements.

The first and second grooves are adapted for being inserted into each other. For example, for connecting two containers, the two containers can each have first and second elements connected to or integrated in one or both side walls of the containers, the first element(s) at the upper edge(s) and the second element(s) at the lower edge(s). To connect the containers, the second groove(s) of one container is inserted into the first groove(s) of the other container to locate the containers stacked on top of each other.

The object to be connected may comprise one or both of the first and second elements. For example may the top object comprise only the second element and the bottom object comprise only the first element. In most cases however, will all objects to be connected comprise both first and other element(s).

The grooves may extend over the full length or a portion of the elements, and the elements may have the same, shorter or longer length than the object they are adapted to be connected to.

The spring member is a flexible device that when exposed to external forces may be compressed, but will return to its original shape and size when in a relaxed state. The spring member and the pin are connected and located in such a way that the spring member in its relaxed state holds the pin retracted from the hole in the second element, and when the spring member is in compressed state, the pin protrudes out of the hole. The spring member is in one embodiment located in the first groove, and the pin extends from the first groove to the hole in the second element.

To securely connect the elements together, the actuating member exerts a force on the spring member to compress it and thus cause the pin to protrude out of the hole in the second element and to the locking portion of the first element. The locking portion may be a contact face where the friction between the contact face and the pin prevents the elements from moving in the insertion direction of the grooves. Alternatively the locking portion may be a recess adapted for reception of the pin when the pin is in its protruding state. In this way the elements are securely connected and prevented from undesired movements in all directions. The grooves limit the movements of the elements to the direction of the grooves, and the pin prevents the elements from moving in this groove-direction. An extra security can be obtained with this arrangement, by designing the pin and locking portion in such a way that the spring member cannot be compressed if the pin and hole of the second element is not aligned with the locking portion of the first element.

The actuating member may be integrated in the second element, for example being the second groove. In this case, the spring element may be located in the first groove and the insertion of the second groove into the first groove compresses the spring element. The actuating member may also be a locking bar for insertion into the first groove, a sliding element integrated in the object or the first or second elongated element, or any other device or object adapted for interaction with the spring member.

The elongated elements may be adapted for mounting in any desired position on the objects to be connected, e.g. with the grooves facing outwards/inwards or upwards/downwards. The spring member and/or the pin may be accessible for an operator from outside the object, or they may be hidden inside the elongated elements or the object to prevent access from outside. When for example the pin is accessible from outside the elements, the locking portion may be designed to give an operator the opportunity to detach the pin from the locking portion without removing the actuating member. This can be desirable when for example a larger number of objects are connected in a stack, and the operator wants to divide the stack into smaller portions for more easy handling and/or transport.

BRIEF DESCRIPTION OF THE DRAWINGS

The invention will now be described in more detail by means of an example with reference to the accompanying figures.

DETAILED DESCRIPTION OF THE PREFERRED EMBODIMENTS

Figure 1:
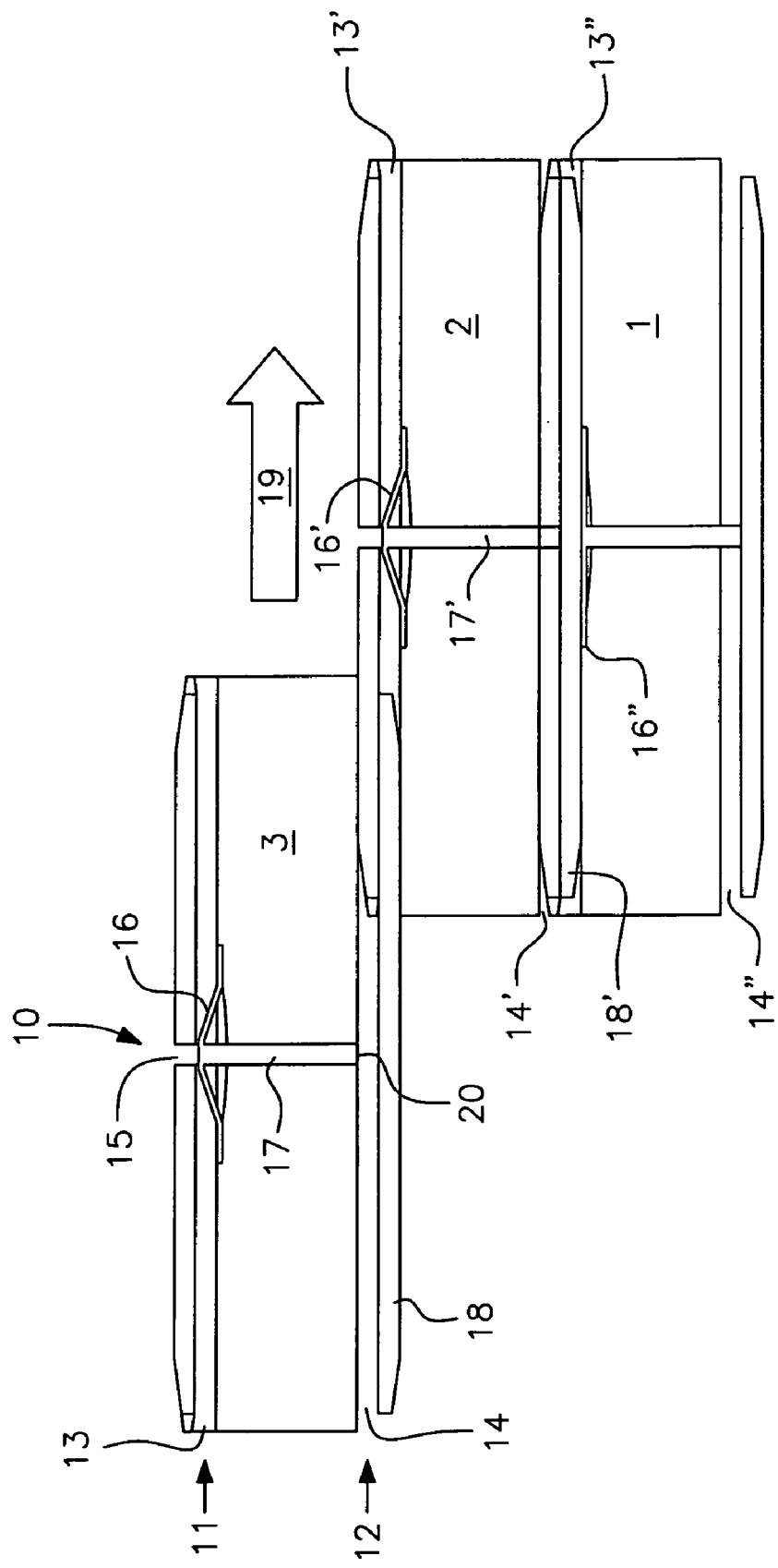
FIG. 1 shows a cross sectional view of one embodiment of the device according to the invention.

In the embodiment in figure 1, the device 10 is connected to a sidewall of objects to be connected. The figure illustrates the connection of three similar objects. The first elongated element 11 with the first groove 13 is arranged in the upper portion of the sidewalls, and the second elongated element 12 with the second groove 14 is arranged in the lower portion of the sidewalls. The spring member 16 is located in a recess in the first groove 11, and the pin 17 extends from the spring member towards, and through by through hole 20, the second element 12. A recess 15 is located in the upper edge of the first element, co-linear to the spring member 16 and pin 17.

To connect the objects, the second groove 14' of the second element 12' of a second object 2 is inserted into the first groove 13" of a first object 1. The lower part 18' of the second element of the second object 2 works as the actuating element and compresses the spring member 16" of the first object, to enable the second groove 14' of the second object to slide past the spring member. The first and the second objects 1, 2 can thus be arranged on top of each other forming a stack of objects, but they still have the freedom to move with respect to each other in the direction 19 of the grooves. To securely lock the objects together, the spring element 16' must be compressed to project the pin 17' out of the second element 12' of the second object 2 and into the recess 15" of the first object 1. This is achieved by inserting the second groove 14' of the second element 12 of a third object 3 into the first groove 13' of the first element 11' of the second object 2. As described above when connecting the first and second objects 1, 2, the lower part 18 of the second element is the actuating member which compresses the spring element 16', forcing the pin 17' to protrude out of the second element 12' of the second object 2 and into the recess 15" in the first object 1, thus preventing the objects 1, 2 from moving with respect to each other.

Figure 2:
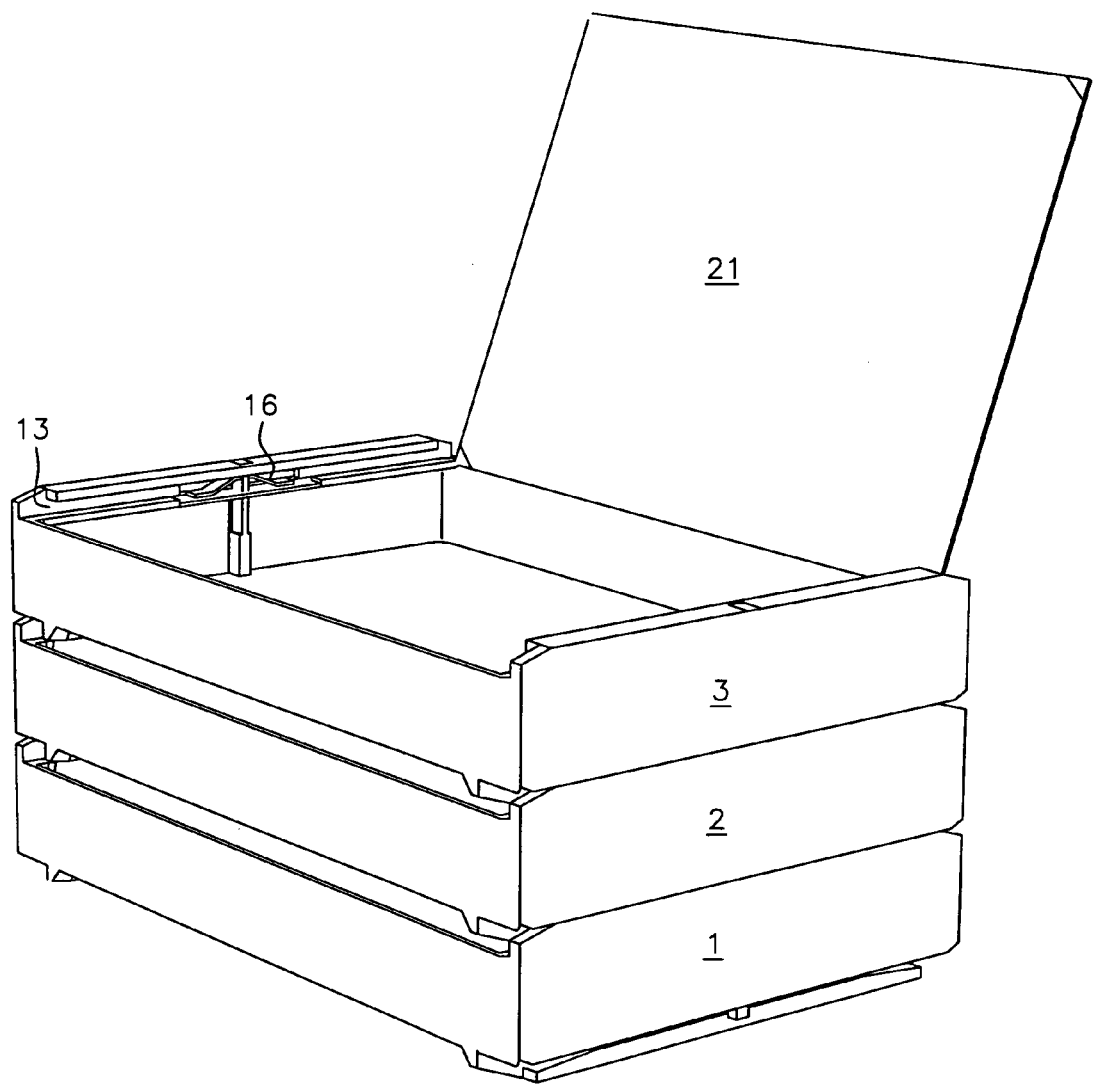
FIG. 2 shows the embodiment of FIG. 1 for connection of containers.

FIG. 2 shows the embodiment of FIG. 1 where three containers are connected by means of the device according to the invention. The containers may for example be storage containers for farmed organisms. The device is integrated into two opposite parallel sidewalls of each container 1, 2, 3. In the figure, the two lower containers 1, 2 are securely connected and locked together, while the third container 3 is connected to the second container 2 by means of the grooves, but can move with respect to container 2 in the direction of the grooves. To lock the third container 3, the spring member must be compressed. This can be done by inserting a lid 21 or another locking member such as a locking bar into the grooves 13. Alternatively the third container 3 can be locked to the second container 2 by connecting a fourth container (not shown) to the third container and thereby compress the spring member 16. This device provides that the upper container can be free to move in the direction of the grooves while the remaining containers still are locked in position. This can be a useful feature for some applications, e.g. when the device is applied to boxes for culturing benthic organisms where the tending can be performed in one box at a time while the rest of the organisms are still in the water.

Figure 3:
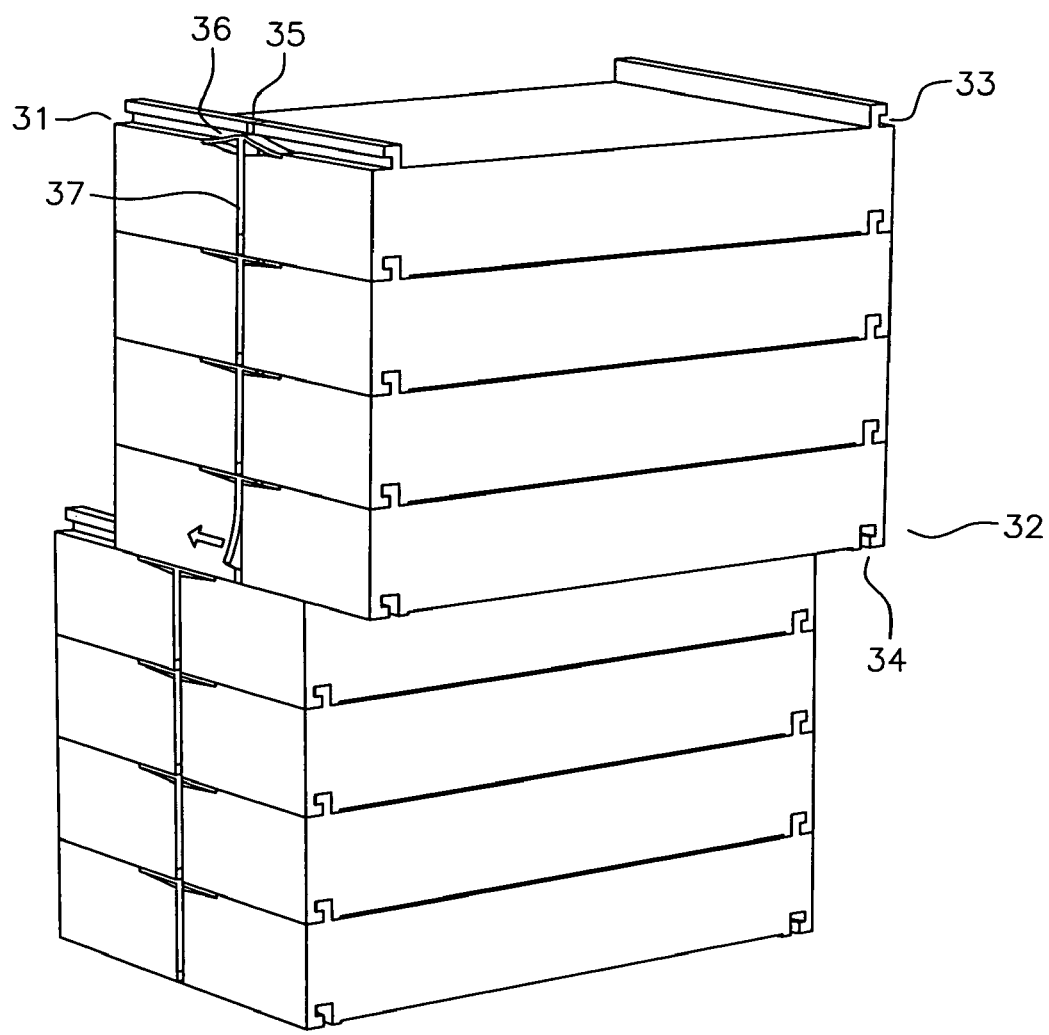
FIG. 3 shows another embodiment of the device according to the invention.

FIG. 3 shows a stack of containers connected by means of another embodiment of the connection device according to the invention. In this embodiment the first and second elongated elements 31, 32 with first and second grooves 33, 34 are integrated in the containers. The spring member 36 and pin 37 are facing outwards and are accessible from the outside of the containers. The containers are connected and locked in the same way as described with reference to FIGS. 1 and 2. In this embodiment, however, the locking portion is a recess 35 which is also open towards the outer surface of the container. In this way an operator have access to the pin when in its protruding state. The pin is preferably made of a flexible material and/or is connected twistable or flexible to the spring member or the pin may comprise a joint to enable the end of the pin to be removed from the recess 35 by bending, pressing, etc. to unlock the connection between two containers. This can be useful for transportation or other handling purposes, where large stacks may be divided into smaller portions before handling.

The invention claimed is:

1. A connection device system comprising at least three parallelly stackable connection devices defining a lower connection device, a middle connection device and an upper connection device, each of said connection devices including:
    a first elongated element with a first groove and a locking portion,
    a second elongated element with a second groove and a through opening,
    an engagement member disposed in the first groove,
    a pin connected to the engagement member and extending perpendicularly from the first elongated element and into the through opening, and
    an actuating member of each connection device being slidably received in the first groove of an another connection device located directly below and adjacent thereto, and
    wherein the actuating member of the upper connection device actuates the engagement member of the middle connection device to move the pin of the middle connection device through the through opening of the middle connection device and into the locking portion of the lower connection device to lock the middle connection device with the lower connection.

2. The connection system according to claim 1, wherein the second elongated element of the upper connection device is inserted into the first groove of the middle connection device.

3. The connection system according to claim 1, wherein the locking portion is a recess in the first groove.

4. The connection system according to claim 1, wherein the engagement member protrudes out of the first groove.

5. The connection system according to claim 1, wherein the second elongated element or a portion of the second elongated element forms the actuating member.

6. The connection system according to claim 1, wherein the pin protrudes out of the through opening in the second groove when the engagement member is in a compressed state.

* * * * *